US008819764B2

(12) United States Patent
Keeni

(10) Patent No.: US 8,819,764 B2
(45) Date of Patent: Aug. 26, 2014

(54) NETWORK SECURITY MONITOR APPARATUS AND NETWORK SECURITY MONITOR SYSTEM

(75) Inventor: Glenn Mansfield Keeni, Miyagi (JP)

(73) Assignee: Cyber Solutions Inc., Miyagi (JP)

( * ) Notice: Subject to any disclaimer, the term of this patent is extended or adjusted under 35 U.S.C. 154(b) by 459 days.

(21) Appl. No.: 12/676,833

(22) PCT Filed: Aug. 28, 2008

(86) PCT No.: PCT/JP2008/065439
§ 371 (c)(1),
(2), (4) Date: Apr. 5, 2010

(87) PCT Pub. No.: WO2009/031453
PCT Pub. Date: Mar. 12, 2009

(65) Prior Publication Data
US 2010/0242084 A1  Sep. 23, 2010

(30) Foreign Application Priority Data

Sep. 7, 2007  (JP) ................................ 2007-232894
Mar. 28, 2008  (JP) ................................ 2008-088007

(51) Int. Cl.
*G06F 17/00* (2006.01)
(52) U.S. Cl.
USPC ............. 726/1; 726/3; 726/4; 726/6; 726/14; 726/22; 713/168; 713/169; 713/170; 380/255
(58) Field of Classification Search
USPC ............ 726/1, 3–6, 13–14, 22; 713/169–170, 713/200; 380/255
See application file for complete search history.

(56) References Cited

U.S. PATENT DOCUMENTS

| | | | | |
|---|---|---|---|---|
| 6,925,079 B2 * | 8/2005 | Matsukawa | ................... | 370/389 |
| 7,134,012 B2 * | 11/2006 | Doyle et al. | .................. | 713/151 |
| 7,623,518 B2 * | 11/2009 | Faulk, Jr. | ...................... | 370/392 |
| 8,107,396 B1 * | 1/2012 | Sharma | ......................... | 370/254 |
| 2005/0198242 A1 * | 9/2005 | Kim | .............................. | 709/223 |
| 2006/0193328 A1 * | 8/2006 | Rao et al. | ................. | 370/395.32 |
| 2008/0285465 A1 * | 11/2008 | Yang | ............................. | 370/241 |
| 2011/0010769 A1 * | 1/2011 | Jarredal | ......................... | 726/13 |

FOREIGN PATENT DOCUMENTS

| | | |
|---|---|---|
| JP | 2001-211180 | 8/2001 |
| JP | 2004-185498 | 7/2004 |
| JP | 2005-079706 | 3/2005 |
| JP | 2005-198090 | 7/2005 |

OTHER PUBLICATIONS

International Search Report, PCT/JP2008/065439, Oct. 28, 2008.

* cited by examiner

*Primary Examiner* — Mohammad A Siddiqi
(74) *Attorney, Agent, or Firm* — Young & Thompson

(57) ABSTRACT

A network security monitoring apparatus and a network security monitoring system manages "permitted" or "not permitted" communication between nodes based on an access policy. A network security monitoring system includes nodes 31,32,33, application server 20, router 40, and network security monitoring apparatus 10 deployed in the network. The network security monitoring apparatus 10 judges whether the nodes are permitted to communicate with other nodes in the network or not based on the access policy, and repeatedly transmits data to block the communication between nodes judged as "not permitted" at fixed time intervals until the access policy is changed from "not permitted" to "permitted". This invention enables to block communication between nodes defined as "not permitted" for communicating with other nodes in the access policy, and to allow communication between nodes defined as "permitted" for communicating with other nodes in the access policy.

8 Claims, 11 Drawing Sheets

Figure 3

Access Policy Example Setting

| Source \ Destination | A1 | C1 | C2 | C3 | R1 |
|---|---|---|---|---|---|
| A1 |  | permitted | not permitted | not permitted | not permitted |
| C1 | permitted |  | not permitted | permitted | permitted |
| C2 | not permitted | not permitted |  | permitted | permitted |
| C3 | not permitted | permitted | permitted |  | not permitted |
| R1 | not permitted | permitted | not permitted | permitted |  |

Figure 11

Example Setting of Communication Permission List

| Node | IP Address | MAC Address |
|---|---|---|
| A1 | IP-A1 | MAC-A1 |
| A2 | IP-A2 | MAC-A21<br>.<br>.<br>.<br>MAC-A2j |
| A3 | IP-A31<br>.<br>.<br>.<br>IP-A3i | MAC-A3 |
| A4 | IP-A41<br>.<br>.<br>.<br>IP-A4k | MAC-A41<br>.<br>.<br>.<br>MAC-A4m | j: natural number greater than 2 i: natural number greater than 2 k: natural number greater than 2
m: natural number greater than 2

NETWORK SECURITY MONITOR APPARATUS AND NETWORK SECURITY MONITOR SYSTEM

TECHNICAL FIELD

The present invention relates to a network security monitoring apparatus, and a network security monitoring system that manages "permitted" or "not permitted" communication between nodes connected to a network based on an access policy.

BACKGROUND TECHNOLOGY

Recently, with increasing scale and complexity of networks, network security has become an indispensable task and a lot of research and development on technologies to prevent unauthorized network access is being carried out.

For instance, "Patent document 1" discloses an access control apparatus, which comprises a network access unit transmitting data to the network and receiving data from the network, an access judgment unit judging whether a node is allowed to communicate with other nodes in the network or not, a network monitor unit monitoring the communication between nodes in the network, an access policy indicating the nodes that are permitted to access other nodes, a communication-blocking unit transmitting data to block the communication between nodes, and a protocol processing unit that analyzes and builds packets of data transferred via the network access unit. The access control apparatus blocks communication via the communication-blocking unit if the network monitor unit detects communication between nodes that are not permitted according to the access policy. Therefore, the access control apparatus controls "permitted" or "not permitted" communication between nodes independent of the hardware or software of nodes even when the unauthorized node sets the ARP-table statically.

"Patent document 2" discloses a system for preventing illegal connections, which comprises an illegitimate connection prevention unit registering the MAC-addresses of nodes permitted to access the network to an approval list, in order to prevent a node not permitted to connect to the network from accessing another node in the network. The illegitimate connection prevention unit transmits ARP-packets with a false MAC-address as MAC-address of a node to the unauthorized node, after a correct ARP-response packet has been sent to the unauthorized node in response to an ARP-request broadcast from the unauthorized node not registered in the approval list, or after a prescribed time interval has elapsed since the last ARP-response packet transmission. Thus, the system is able to prevent connections to private servers and other nodes in the same subnet from an unauthorized node not permitted to connect to the network and prevent connections to the external network via routers etc from an unauthorized node.

"Patent document 3" discloses an apparatus for preventing illegal connections, which comprises the following steps. In the first step it transmits ARP-requests successively to all registered nodes, in the second step it judges whether the profile of the node has been already registered based on the ARP-replies received from the node in response to the ARP-request, and in the third step it judges whether the node is unauthorized and transmits disturb-messages which shows that the node includes multiple profiles if it is judged that the node has not been registered. Thus, the apparatus is able to prevent unauthorized network access.

[Patent document 1] Japanese Patent Laid-Open No. 2004-185498
[Patent document 2] Japanese Patent Laid-Open No. 2005-079706
[Patent document 3] Japanese Patent Laid-Open No. 2005-198090

DISCLOSURE OF THE INVENTION

Problem to be Solved by the Invention

However, the access control apparatus, described in patent document 1, which monitors the communication between nodes by inspecting ARP-requests and restricts network access by transmitting a false ARP-reply to nodes C1 and C2 if communication between nodes (node C1 and C2) is detected and is judged as "not permitted" according to the specified access policy, the following problems arise:

(i) The access control to block the communication between node C1 and C2 cannot be executed, because the ARP tables of node C1 and C2 are overwritten with the latest data. Node C1 and C2 may receive the correct ARP-reply after receiving the false ARP-reply transmitted by the access control apparatus due to a delay in the network.

(ii) The access control to block the communication between node C1 and C2 cannot be executed, because the ARP tables of nodes C1 and C2 are already set (fresh ARP-requests are not generated) if the access policy for communication between nodes C1 and C2 is changed from "permitted" to "not permitted" while communication between the two nodes is ongoing.

(iii) The access control to block the communication between nodes C1 and C2 cannot be executed, because node C1 can transmit data to node C2 without generating an ARP-request if the ARP-table of node C1 has been set statically.

The system for preventing illegal connections, described in patent document 2, solves the above-mentioned problem (i), because the illegitimate connection prevention unit registers the MAC-addresses of nodes permitted to access the network in an approval list, and transmits ARP-packets with a false MAC-address as MAC-address of a node to the unauthorized node, after the correct ARP-response packet has been sent to the unauthorized node in response to an ARP-request broadcast from the unauthorized node not registered in the approval list, or at prescribed time intervals. In comparison to the access control apparatus, described in patent document 1, that judges whether communication between nodes is allowed or not based on an access policy and manages network access accordingly, the system for preventing illegal connections, described in patent document 2, blocks communication between unauthorized nodes not registered in the approval list and any node registered in the approval list. However, the system for preventing illegal connections, described in patent document 2, cannot solve the above-mentioned problems (ii) and (iii) by replacing the access policy with an approval list.

The apparatus for preventing illegal connections, described in patent document 3, solves the above-mentioned problem (i), because the apparatus transmits ARP-requests successively to all registered nodes, judges whether the profile of a node has been already registered in the address database unit from the ARP-replies received from the node in response to the ARP-request, and transmits disturb-messages (disturb-ARP-reply or disturb-ARP-request) indicating that multiple profiles of the node exist if the unauthorized node is not registered, and then transmits the disturb-messages repeatedly at fixed time intervals for a specified number of times, in view of a possible message loss in the network. In comparison to the access control apparatus, described in patent document 1, that judges whether communication between particular nodes is allowed or not based on an access policy and manages network access accordingly, the apparatus for preventing illegal connections, described in patent document 3, blocks the communication between an unauthorized node not registered in the address database unit and any node registered in the address database unit. However, the apparatus for preventing illegal connections, described in patent document 3, cannot solve the above-mentioned problems (ii) and (iii) by replacing the access policy with the address database unit.

The present invention proposes a solution to the above problems by providing a network security monitoring apparatus and a network security monitoring system that judges whether a node is permitted to communicate with other nodes in the network or not based on an access policy and reliably blocks the communication between nodes judged as "not permitted".

Means to Solve the Problem

The invention described in an embodiment is a network security monitoring apparatus that manages "permitted" or "not permitted" communication between all nodes connected to a network based on an access policy, comprising: a packet monitor processing means for monitoring packets transmitted by and received from all nodes connected to the network, a policy management processing means for managing the access policy for all nodes in the network, an access control processing means for judging whether a node is permitted to communicate with other nodes in the network or not based on the above-mentioned access policy, and a communication blocking processing means for blocking communication between nodes judged as "not permitted", wherein the above-mentioned communication blocking processing means blocks communication between nodes judged as "not permitted" based on the above-mentioned access policy by transmitting ARP packets with a false MAC-address (FMAC) to the nodes judged as "not permitted" and generates the FMAC using a one-way function genFMAC with multiple input parameters and wherein the above-mentioned access control processing means extracts one or more ARP packets containing a false MAC-address from ARP packets received by the above-mentioned packet monitor processing means, and judges the extracted ARP packets to be attack packets that illegally attempt to block communication in a case where the MAC-address of the extracted ARP packets is not the same as the value of FMAC generated by the one-way function genFMAC. The above-mentioned one-way function genFMAC, e.g. a hash function for computing the hash value FMAC, may be defined as follows:

FMAC=genFMAC(SeedMAC,Time,Secret)

The parameter "SeedMac" is the Organizationally Unique Identifier (OUI: Organizationally Unique Identifier) that makes up the first 24 bits of a MAC-address (48 bits). The parameter "Time" is time data representing year, month, day, hour, minute and second, and the value of the parameter "Time" is composed of a combination of them. The parameter "Secret" is a non-public key, which is confidential information and will be known only to an authorized manager. The latter 24 bits of the MAC address (48 bits) is composed of a pseudorandom number generated by a hash function with values specified for the parameters "Time" and "Secret".

The access control processing means may generate an alarm to the effect that an attack packet attempting to illegally block communication has been detected in a case where the access control processing means judges the extracted ARP packet to be an attack packet that illegally attempts to block communication.

The communication blocking processing means may block communication between nodes judged as "not permitted" by continuously transmitting data to block communication until the access policy of the node judged as "not permitted" is changed from "not permitted" to "permitted".

The data continuously transmitted to block communication between nodes judged as "not permitted" may be transmitted at fixed time intervals set by a user.

Effect of the Invention

The invention enables the network security monitoring apparatus to reliably and easily detect attack packets that block communication illegally, by extracting ARP packets containing a source IP-address which exists in the communication permission list, identifying node Ak (k: natural number greater than 1) corresponding to that IP-address, and judging the extracted ARP packets to be attack packets that illegally attempt to block communication if the source MAC-address of the extracted ARP packets is not the same as the MAC-address of the node Ak registered in the communication permission list. Furthermore, this invention enables the administrator to take quick actions, by generating an alarm when an attempt to illegally block communication has been detected. Furthermore, this invention enables to quickly recover communication between nodes illegally blocked, by transmitting an ARP packet containing the correct MAC-address when an attack is detected.

The invention enables the network security monitoring apparatus to reliably and easily detect attack packets that block communication illegally, by extracting ARP packets containing a destination IP-address which exists in the communication permission list, identifying node Ak (k: natural number larger than 1) corresponding to that IP-address, identifying node B corresponding to the source IP-address of the extracted ARP packets, and judging the extracted ARP packets to be attack packets that illegally attempt to block communication if the source MAC-address of the extracted ARP packets is not the same as the MAC-address of the node B registered in the above-mentioned access policy. Furthermore, this invention enables the administrator to take quick actions, by generating an alarm when an attack to illegally block communication has been detected. Furthermore, this invention enables to quickly recover communication between nodes illegally blocked, by transmitting an ARP packet containing the correct MAC-address when an attack is detected.

The invention described in an embodiment enables the network security monitoring apparatus to easily distinguish between ARP packets that illegally block communication and ARP packets transmitted to block communication between nodes that have been judged on the present invention, by generating a false MAC-address (FMAC) contained in ARP packets that are transmitted to block communication between nodes that have been judged as "not permitted" on the access policy using a one-way function genFMAC. The above-mentioned one-way function genFMAC, e.g. a hash function for computing the hash value FMAC, may be defined as follows:

FMAC=genFMAC(SeedMAC,Time,Secret)

The parameter "SeedMac" is the Organizationally Unique Identifier (OUI: Organizationally Unique Identifier) that makes up the first 24 bits of a MAC address (48 bits). The parameter "Time" is time data representing year, month, day, hour, minute and second, and the value of the parameter "Time" is composed of a combination of them. The parameter "Secret" is a non-public key, which is confidential information and will be known only to an authorized manager. The latter 24 bits of the MAC address (48 bits) is composed of a pseudorandom number generated by a hash function with values specified for the parameters "Time" and "Secret". Hash functions have the characteristic that input value cannot be computed from output value and input value with identical output value cannot be easily generated. Therefore, utilizing this characteristic, this invention enables reliable and simple detection of attacks to illegally block communication, by comparing the "false MAC-address" contained in ARP packets that illegally block communication with the value of FMAC. Furthermore, this invention enables the administrator to take quick actions, by generating an alarm when an attack to illegally block communication has been detected.

The invention described in an embodiment enables the network security monitoring system to reliably and easily detect attack packets that attempt to illegally block communication by network security monitoring apparatus deployed in network segments. Furthermore, this invention enables the administrator to take quick actions, by generating an alarm when an attack to block communication illegally has been detected. Furthermore, this invention enables to quickly recover communication between nodes illegally blocked, by transmitting an ARP packet containing the correct MAC-address when an attack is detected.

BRIEF DESCRIPTION OF DRAWINGS

FIG. 3 shows an example setting of the access policy provided with the prototype of the network security monitoring apparatus embodying best mode of the present invention.

FIG. 11 shows an example setting of the communication permission list provided with the prototype of the network security monitoring apparatus embodying best mode of the present invention.

EXPLANATION OF CODES USED IN THE DIAGRAMS

Figure 1:
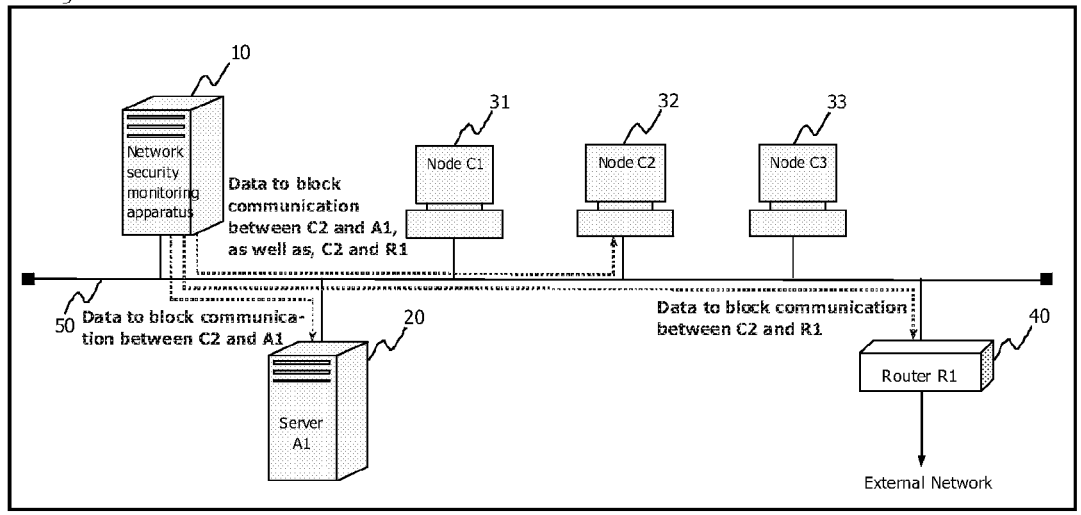
FIG. 1 shows a configuration example of a network with the prototype of the network security monitoring apparatus embodying best mode of the present invention.

10 Network security monitoring apparatus
11 Packet monitor processing means
12 Access control processing means
13 Communication blocking processing means
14 Policy management processing means
15 Access policy
20 Application server
31 Node
32 Node
33 Node
40 Router
50 Network

BEST MODE FOR CARRYING OUT THE INVENTION

In the following, the prototype of the network security monitoring system embodying best mode of the present invention is described with reference to diagrams. However, the present invention is not limited to this prototype.

FIG. 1 shows a configuration example of a network with the prototype of the network security monitoring apparatus embodying best mode of the present invention. In FIG. 1, nodes 31, 32 and 33, application server 20 and router 40 are connected to network 50. Furthermore, the network security monitoring apparatus 10 monitoring and preventing unauthorized access in network 50 is connected.

Figure 2:
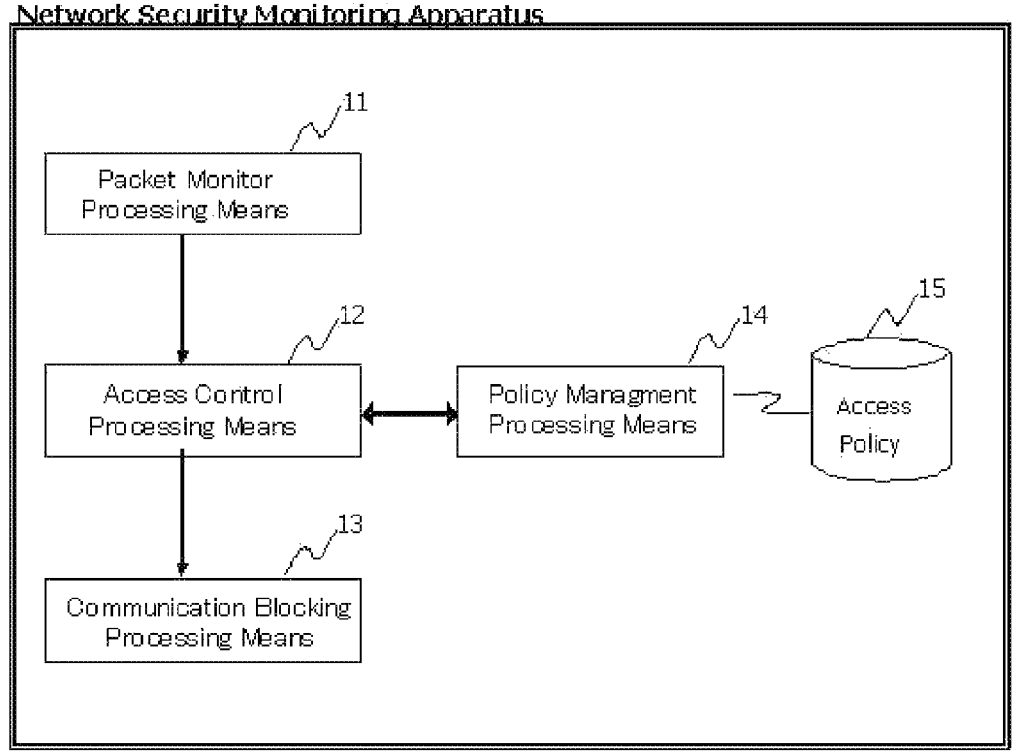
FIG. 2 shows a block diagram depicting the structure of the prototype of the network security monitoring apparatus embodying best mode of the present invention.

FIG. 2 shows a block diagram depicting the structure of the prototype of the network security monitoring apparatus embodying best mode of the present invention. As shown in FIG. 2, the network security monitoring apparatus 10 comprises a packet monitor processing means 11 that monitors packets transmitted by and received from all nodes connected to the network, a policy management processing means 14 that manages the access policy 15 for all nodes in the network, an access control processing means 12 that judges whether a node is permitted to communicate with other nodes in the network or not based on the access policy 15 and a communication blocking processing means 13 that blocks communication between nodes judged as "not permitted". The access control processing means 12 identifies the nodes from the source IP-address included in the packets received by the packet monitor processing means 11 and judges whether that node is permitted to communicate with other nodes in the network or not based on the access policy 15. The communication blocking processing means 13 blocks communication between nodes that are not permitted in the access policy 15 and allows communication between nodes that are permitted in the access policy 15, by repeatedly transmitting data to block communication between nodes judged as "not permitted" at fixed time intervals. Here, "repeatedly transmitting data at fixed time intervals" means to continue transmitting data to block communication until the access policy of the node judged as "not permitted" has been changed from "not permitted" to "permitted". Then, "fixed time intervals" can be appropriately set by the user. Thus, the network security monitoring apparatus enables to quickly and reliably block communication between nodes judged as "not permitted", by completely blocking communication between nodes judged as "not permitted" and the other nodes in the network.

FIG. 3 shows an example setting of the access policy provided with the prototype of the network security monitoring apparatus embodying best mode of the present invention. In the following, a concrete example setting of the access policy (the access policy 15 in which the communication between node C1 and server A1, as well as, nodes C2 and C1 is defined as "not permitted") is explained using FIGS. 1, 2 and 3.

When the packet monitor processing means 11 receives packets (ARP-request packets) transmitted from node C2 to server A1, the access control processing means 12 identifies the node from the source IP-address included in the packet received from the packet monitor processing means 11 and judges whether this node is permitted to communicate with other nodes in the network or not based on the access policy 15. In this case, the communication blocking processing means 13 repeatedly transmits data to block communication between node C2 and server A1, as well as, between nodes C2 and C1 at fixed time intervals, based on the access policy 15 in which the communication between node C1 and server A1, as well as, nodes C2 and C1 is defined as "not permitted". Here, "repeatedly transmitting" means to continue transmitting data to block communication until the access policy for the communication between node C2 and server A1, as well as, between nodes C2 and C1 has been changed from "not permitted" to "permitted". Thus, the network security monitoring apparatus enables to quickly and reliably block communication between node C2 and server A1, as well as, between nodes C2 and C1, by receiving packets (ARP-request packets) transmitted from node C2 to server A1. At the same time, the network security monitoring apparatus enables to allow communication between nodes C2 and C3, as well as, node C2 and router R1, which are permitted in the access policy 15.

The packet monitor processing means 11 receives ARP-request packets transmitted from nodes in the network. The access control processing means 12 identifies the node corresponding to the source IP-addresses included in these packets and judges whether this node is permitted to communicate with other nodes in the network or not based on the access policy 15. Then, the communication blocking processing means 13 transmits data (e.g. false ARP replies) repeatedly at fixed time intervals to block communication judged as "not permitted". Here, "repeatedly transmitting at fixed time intervals" means to quickly and reliably block communication between nodes judged as "not permitted", even if a delay occurs in the network or the ARP table is set statically.

Thus, the network security monitoring apparatus enables to solve the problem that access control to block communication between nodes C2 and C1 cannot be executed when communication between nodes C2 and C1 is defined as "not permitted" in the access policy, because the ARP tables of nodes C2 and C1 are overwritten with the data arrived later in time if nodes C2 and C1 receive the correct ARP-reply after nodes C2 and C1 have received the false ARP-reply transmitted by the access control apparatus when a delay occurs in the network. Furthermore, the network security monitoring apparatus enables to solve the problem that access control to block communication between nodes C2 and C1 cannot be executed when communication between nodes C2 and C1 is defined as "not permitted" in the access policy, because node C1 can transmit data to node C2 without transmitting ARP-request if the ARP-table of node C1 that is not permitted on the access policy has been set statically.

Figure 4:
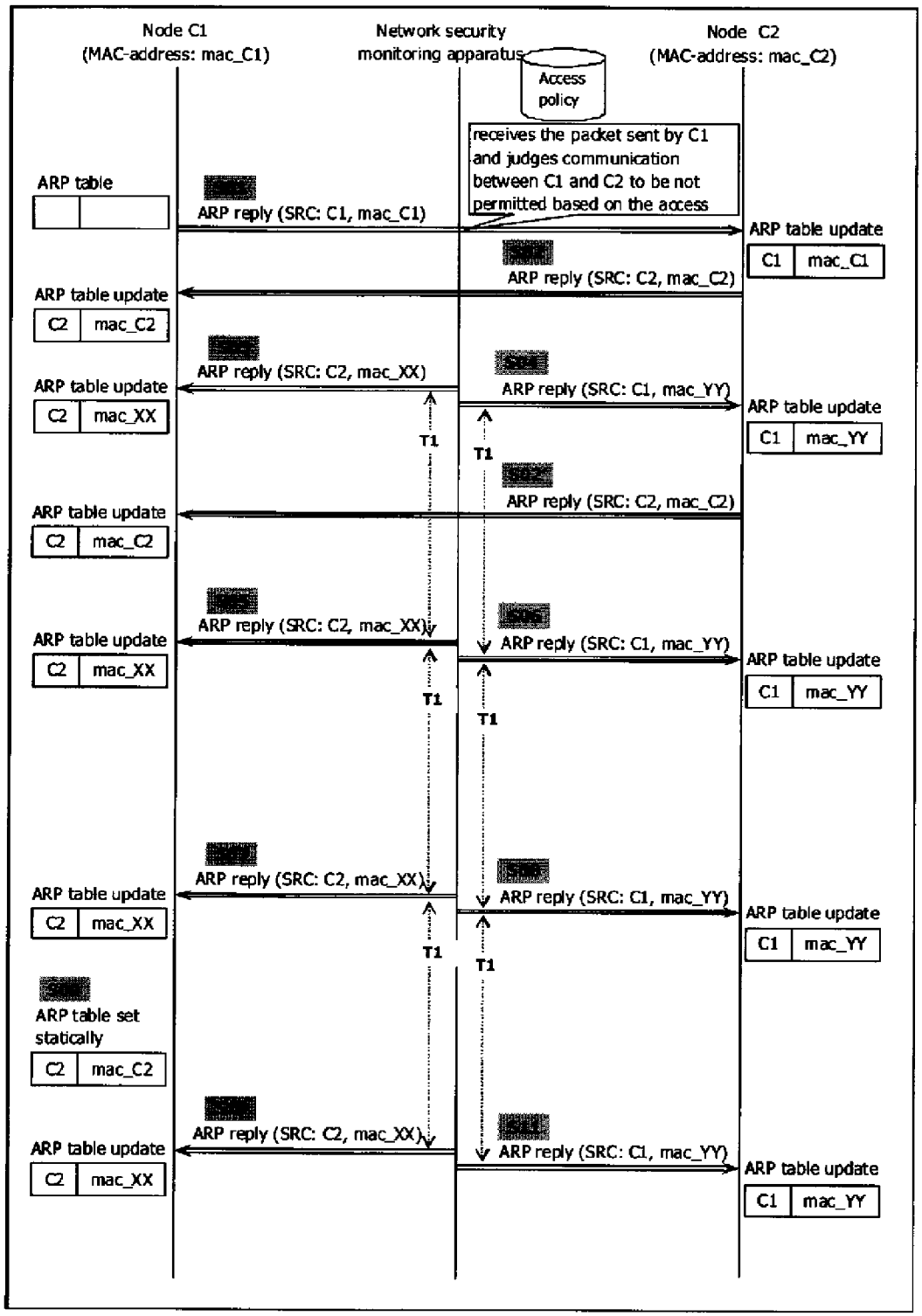
FIG. 4 shows a sequence example between the prototype of the network security monitoring apparatus embodying best mode of the present invention and nodes C1 and C2, as well as, between nodes C1 and C2.

FIG. 4 shows a sequence example between the prototype of the network security monitoring apparatus embodying best mode of the present invention and nodes C1 and C2, as well as, between nodes C1 and C2. In the following, a concrete example (the access policy in which the communication between nodes C1 and C2 is defined as "not permitted") is explained using FIG. 4.

(1) Node C1 broadcasts an ARP-request packet with its IP-address, its MAC-address (mac_C1) and the IP-address of node C2 to obtain the MAC-address of node C2 in order to start communicating with the node C2 (S01).

(2) When node C2 receives the ARP-request packet containing its IP-address, node C2 transmits an ARP-reply packet with its IP-address and Mac-address (mac_C2) to node C1 (S02). When node C1 receives the ARP-reply packet, node C1 updates its ARP table (sets mac_C2 as MAC-address of node C2). Here, the data of the ARP table is cached at fixed time. Therefore, node C1 can communicate with node C2 afterwards using the data of the ARP table without transmitting ARP-request packets.

(3) When the network security monitoring apparatus receives the ARP-request packet transmitted from node C1, the network security monitoring apparatus judges communication between nodes C1 and C2 as "not permitted" based on the access policy, and transmits an ARP-reply packet with the IP-address of node C2 and a false MAC-address (mac_XX) to node C1 (S03). When node C1 receives the ARP-reply packet, node C1 updates its ARP table (sets mac_XX as MAC-address of node C2 in its ARP table). As a result, node C1 cannot communicate with node C2 because the MAC-address of node C2 is not correct, even if node C1 attempts to communicate with node C2.

(4) Besides, the network security monitoring apparatus transmits an ARP-reply packet with the IP-address of node C1 and a false MAC-address (mac_YY) to node C2 (S04). When node C2 receives the ARP-reply packet, node C2 updates its ARP table (sets mac_YY as MAC-address of node C1). As a result, node C2 cannot communicate with node C1 because the MAC-address of node C1 is not correct.

(5) Besides, the ARP-reply packet transmitted from node C2 (S02) will arrive later in time when a delay occurs in the network (S02'). In such case, the ARP table of node C1 will be overwritten with the correct data (mac_C2 is set as MAC-address of node C2). As a result, access control to block the communication between nodes C1 and C2 cannot be executed.

(6) As the solution, the network security monitoring apparatus transmits ARP-reply packets with the IP-address of node C2 and the false MAC-address (mac_XX) to node C1 after a fixed time (T1) passes (S05). When node C1 receives the ARP-reply, node C1 updates its ARP table (sets mac_XX as MAC-address of node C2). As a result, node C1 cannot communicate with node C2 because the MAC-address of node C2 is not correct. Then, the network security monitoring apparatus continues transmitting ARP-reply packets with the IP-address of node C2 and the false MAC-address (mac_XX) to node C1 at fixed time intervals (T1) until the access policy has been changed from "not permitted" to "permitted" (S07, S10).

(7) Similarly, the network security monitoring apparatus transmits ARP-reply packets with the IP-address of C1 and the false MAC-address (mac_YY) to node C2 after a fixed time (T1) passes (S06). When node C2 receives the ARP-reply packet, node C2 updates its ARP table (sets mac_YY as MAC-address of node C1). As a result, node C2 cannot communicate with node C1 because the MAC-address of node C1 is not correct. Then, the network security monitoring apparatus continues transmitting ARP-reply packets with the IP-address of node C1 and the false MAC-address (mac_YY) to node C2 at fixed time intervals (T1) until the access policy has been changed from "not permitted" to "permitted" (S08, S11).

(8) Besides, access control to block the communication between nodes C1 and C2 cannot be executed if the ARP table of node C1 has been set statically (e.g. mac_C2 has been set as MAC-address of node C2) (S09). As the solution, the network security monitoring apparatus transmits ARP-replay packets with the IP-address of node C2 and the false MAC-address (mac_XX) to node C1 after a fixed time (T1) passes (S10). When node C1 receives the ARP-reply packet, node C1 updates its ARP table (sets mac_XX as MAC-address of the node C2). As a result, node C1 cannot communicate with node C2 because the MAC-address of node C2 is not correct.

Furthermore, the packet monitor processing means 11 broadcasts ARP-request packets to all nodes connected to the network at fixed time intervals. The access control processing means 12 identifies the nodes corresponding to the source address included in the ARP-reply packets received, and judges whether the node is permitted to communicate with other nodes in the network or not based on the access policy 15. The communication blocking processing means 13 repeatedly transmits data (e.g. false ARP-reply packets) to block communication between nodes judged as "not permitted" at fixed time intervals. Here, by broadcasting ARP-request packets to all nodes connected to the network at fixed time intervals, the network security monitoring apparatus enables to detect nodes that do not transfer packets for long time and to block the communication judged as "not permitted" reliably. If the network security monitoring apparatus detects a node that is not yet registered in the access policy, the network security monitoring apparatus registers the communication of this node as "not permitted" in the access policy. Thus, the network security monitoring apparatus enables to block unauthorized access reliably.

Figure 5:
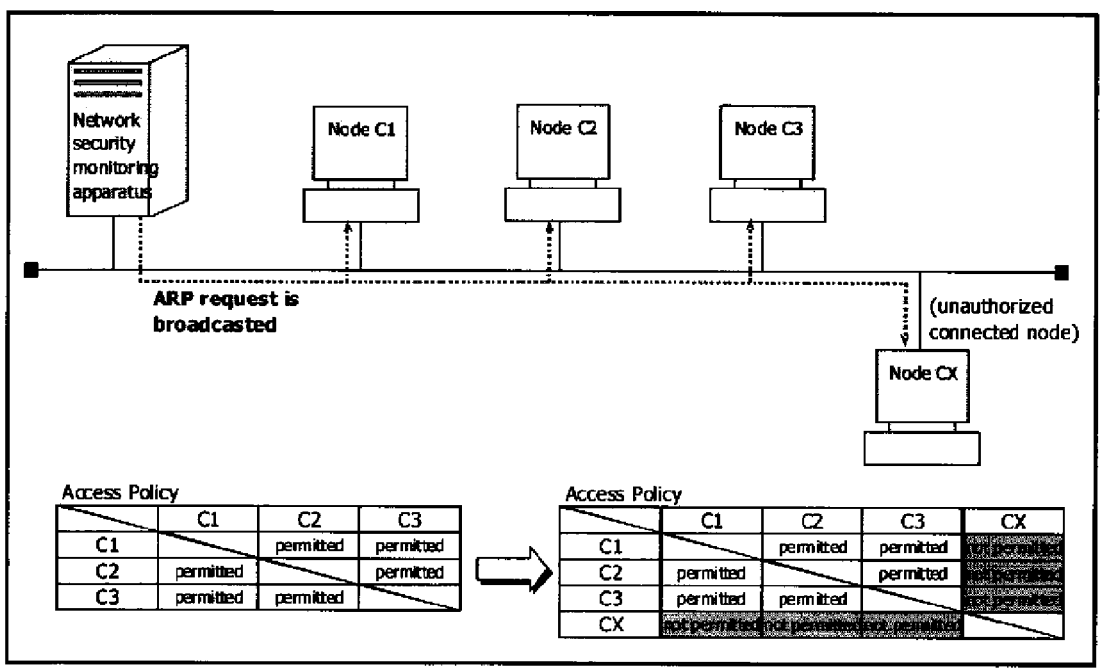
FIG. 5 shows a configuration example of a network with the prototype of the network security monitoring apparatus embodying best mode of the present invention, wherein unauthorized node is connected to the network.

FIG. 5 shows a configuration example of a network with the prototype of the network security monitoring apparatus embodying best mode of the present invention, wherein unauthorized node is connected to the network. As shown in FIG. 5, the communication between nodes (node C1, C2 and C3) is set as "permitted" or "not permitted" in the access policy provided with the network security monitoring apparatus. The network security monitoring apparatus has not yet recognized node CX.

The network security monitoring apparatus broadcasts ARP-request packets to all nodes connected to the network at fixed time intervals, and receives ARP-reply packets from nodes C1, C2, C3 and CX, in order to monitor nodes connected to the network. The network security monitoring apparatus identifies the node corresponding to the source address included in the ARP-reply packets, and judges whether nodes C1, C2, C3 and CX are permitted to communicate with other nodes in the network or not based on the access policy. Then, the network security monitoring apparatus repeatedly transmits data (e.g. false ARP-reply packet) to block communication between nodes judged as "not permitted" at fixed time intervals. Furthermore, the network security monitoring apparatus additionally registers node CX to the access policy and sets the communication between node CX and nodes C1, C2, and C3 as "not permitted", because node CX is not yet registered in the access policy. Thus, the network security monitoring apparatus enables to block unauthorized access reliably.

Figure 6:
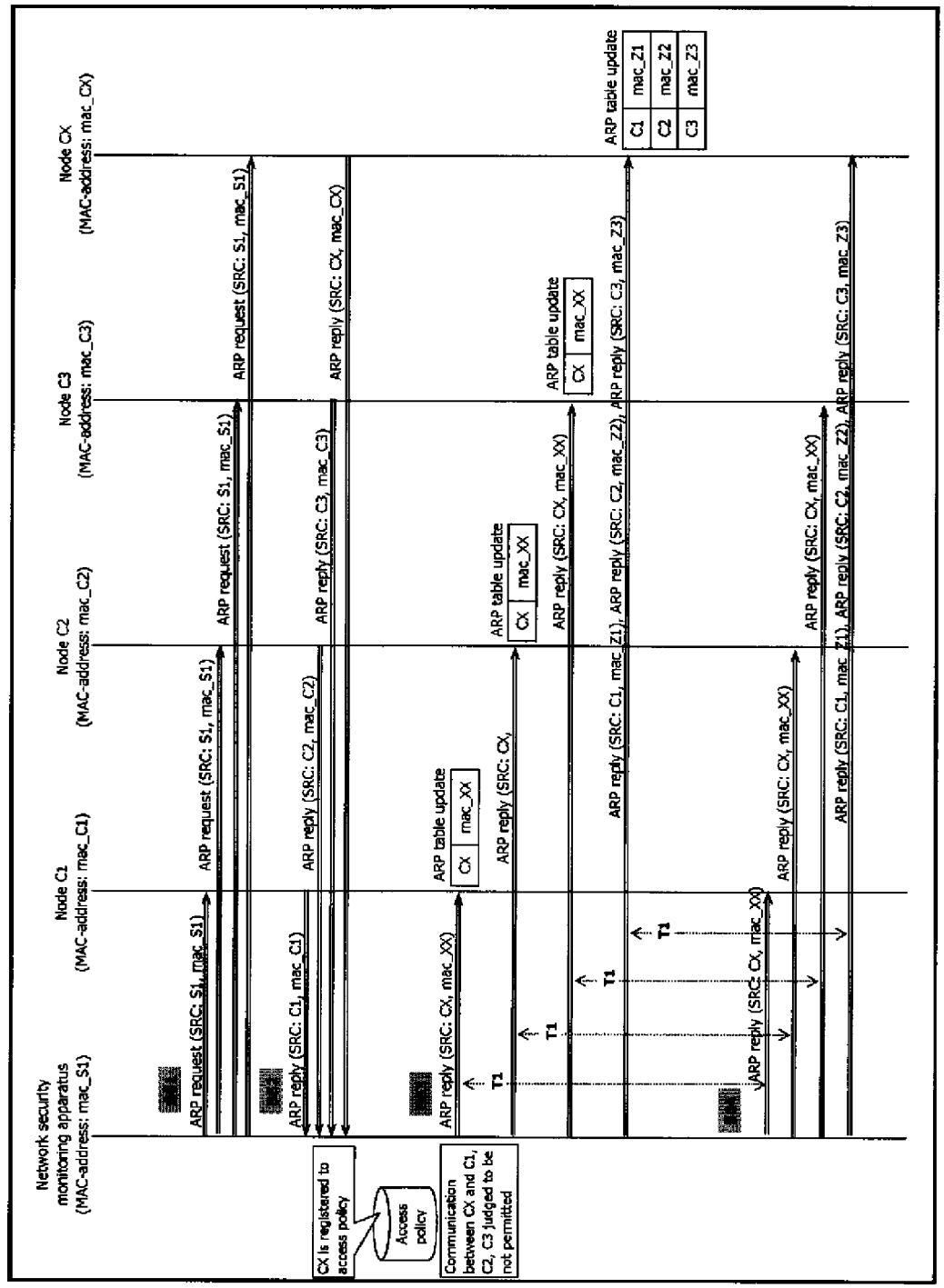
FIG. 6 shows a sequence example between the prototype of the network security monitoring apparatus embodying best mode of the present invention and nodes CX, C1, C2 and C3.

FIG. 6 shows a sequence example between the prototype of the network security monitoring apparatus embodying best mode of the present invention and nodes CX, C1, C2 and C3, based on the configuration example as shown in FIG. 5. In the following, a concrete example is explained using FIG. 6.

(1) The network security monitoring apparatus broadcasts ARP-request packets against all IP-addresses in the network in order to monitor the nodes connected to the network (S61). This step S61 is repeated at fixed time intervals.

(2) The network security monitoring apparatus receives ARP-reply packets from nodes C1, C2, C3 and CX (S62). The network security monitoring apparatus identifies the node corresponding to the source address included in the ARP-reply packets, and judges whether nodes C1, C2, C3 and CX are permitted to communicate with other nodes in the network or not based on the access policy. Furthermore, the network security monitoring apparatus additionally registers node CX to the access policy and sets the communication between node CX and nodes C1, C2, and C3 as "not permitted", because node CX is not yet registered in the access policy.

(3) The network security monitoring apparatus transmits ARP-reply packets to node CX with false MAC-addresses (mac_Z1, mac_Z2, mac_z3) as MAC-addresses of nodes C1, C2 and C3, and transmits ARP-reply packets to nodes C1, C2 and C3 with a false MAC-address (mac_XX) as MAC-address of nodes CX, in order to block communication between node CX that has been judged as "not permitted" and nodes C1, C2 and C3 (S63). Thus, the network security monitoring apparatus enables to block communication between the node CX and nodes C1, C2 and C3, because the ARP table of the node CX has been updated (mac_Z1 as MAC-address for node C1, mac_Z2 as MAC-address for node C2 and mac_z3 as MAC-address for node C3 have been set) after receiving the ARP-reply packets with false MAC-addresses as MAC-addresses of nodes C1, C2 and C3, as well as the ARP table of nodes C1, C2, and C3 have been updated (mac_XX as MAC-address for the node CX has been set) after receiving the ARP-reply packets with false MAC-addresses as MAC-addresses of the nodes CX.

(4) The network security monitoring apparatus continues transmitting the ARP-reply packets at fixed time intervals (T1) until the access policy has been changed from "not permitted" to "permitted" (S64).

As clarified above, the network security monitoring apparatus enables to block communication between nodes (between CX and C1, CX and C2, CX and C3) quickly and reliably, by transmitting ARP-reply packets repeatedly in fixed time intervals (T1) to node CX with false MAC-addresses as MAC-addresses of nodes C1, C2 and C3 with which node CX is not permitted to communicate based on the access policy, as well as transmitting ARP-reply packets repeatedly at fixed time intervals (T1) to nodes C1, C2 and C3 with false MAC-addresses as MAC-addresses of node CX.

Figure 7:
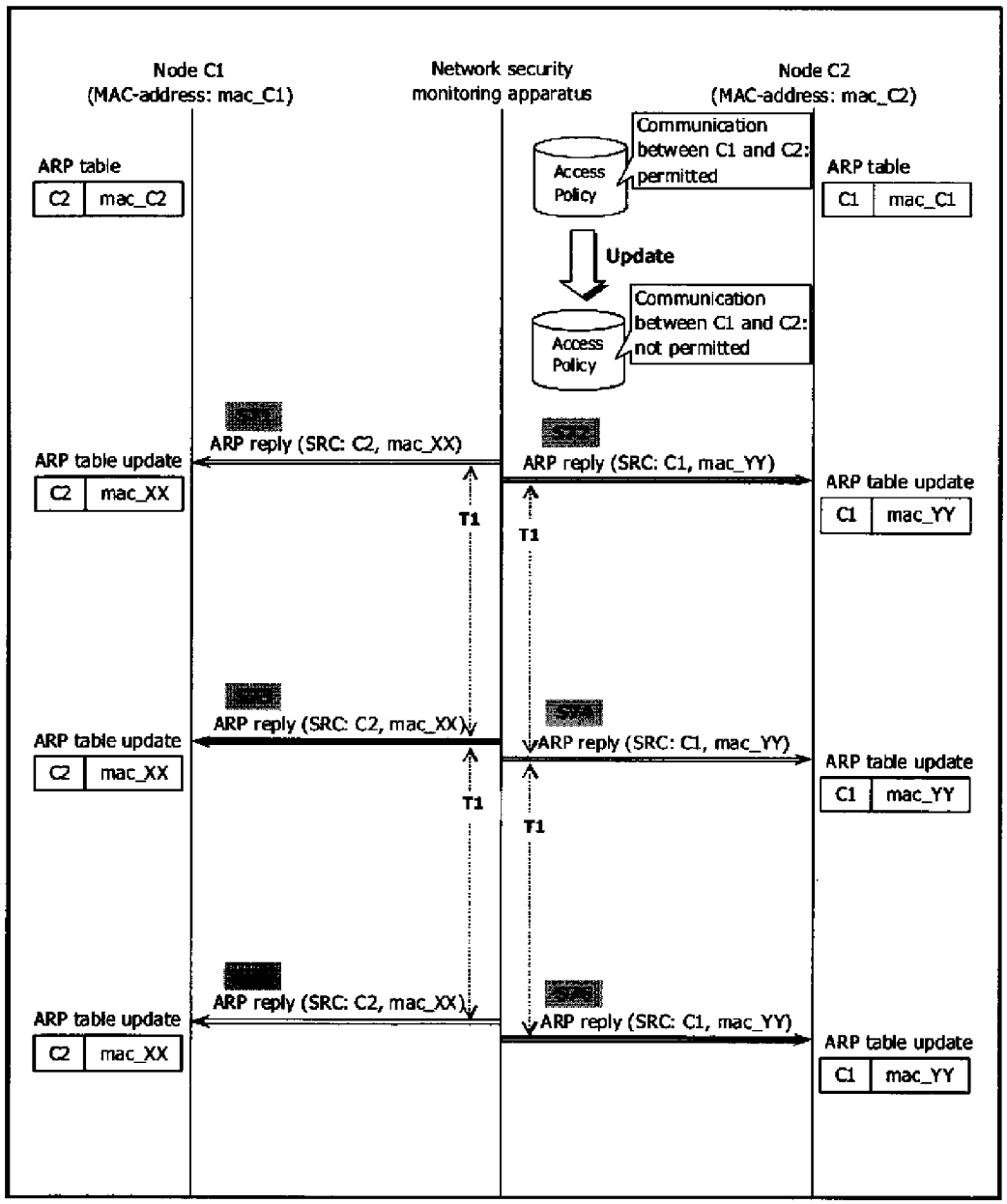
FIG. 7 shows a sequence example between the prototype of the network security monitoring apparatus embodying best mode of the present invention and nodes C1 and C2, after the access policy provided with the prototype of the network security monitoring apparatus has been changed from "permitted" to "not permitted".

FIG. 7 shows a sequence example between the prototype of the network security monitoring apparatus embodying best mode of the present invention and nodes C1 and C2, after the access policy provided with the prototype of the network security monitoring apparatus has been changed from "permitted" to "not permitted". In the following, a concrete example is explained using FIG. 7.

(1) After the communication between nodes C1 and C2 defined in the access policy has been changed from "permitted" to "not permitted", the network security monitoring apparatus transmits ARP-reply packets to node C1 with the IP-address of node C2 and a false MAC-address (mac_XX) as MAC-address of node C2 (S71). When node C1 receives the ARP-reply packets, node C1 updates its ARP table (sets mac_XX as MAC-address of node C2). As a result, node C1 cannot communicate with node C2 because the MAC-address of node C2 is not correct, even if node C1 attempts to communicate with node C2.

(2) Besides, the network security monitoring apparatus transmits ARP-reply packets to node C2 with the IP-address of node C1 and a false MAC-address (mac_YY) as MAC-address of node C1 (S72). When node C2 receives the ARP-reply packets, node C2 updates its ARP table (sets mac_YY as MAC-address of node C1). As a result, node C2 cannot communicate with node C1 because the MAC-address of node C1 is not correct.

(3) The network security monitoring apparatus continues transmitting the ARP-reply packets at fixed time intervals (T1) until the access policy has been changed from "not permitted" to "permitted" (S73, S74, S75, S76).

As clarified above, the network security monitoring apparatus enables to block communication between nodes (e.g. C1 and C2) quickly and reliably, by transmitting ARP-reply packets repeatedly at fixed time intervals (T1) to node C1 with false MAC-address as MAC-address of node C2, as well as transmitting ARP-reply packets repeatedly at fixed time intervals (T1) to node C2 with false MAC-address as MAC-address of node C1, after the access policy has been changed from "permitted" to "not permitted".

Figure 8:
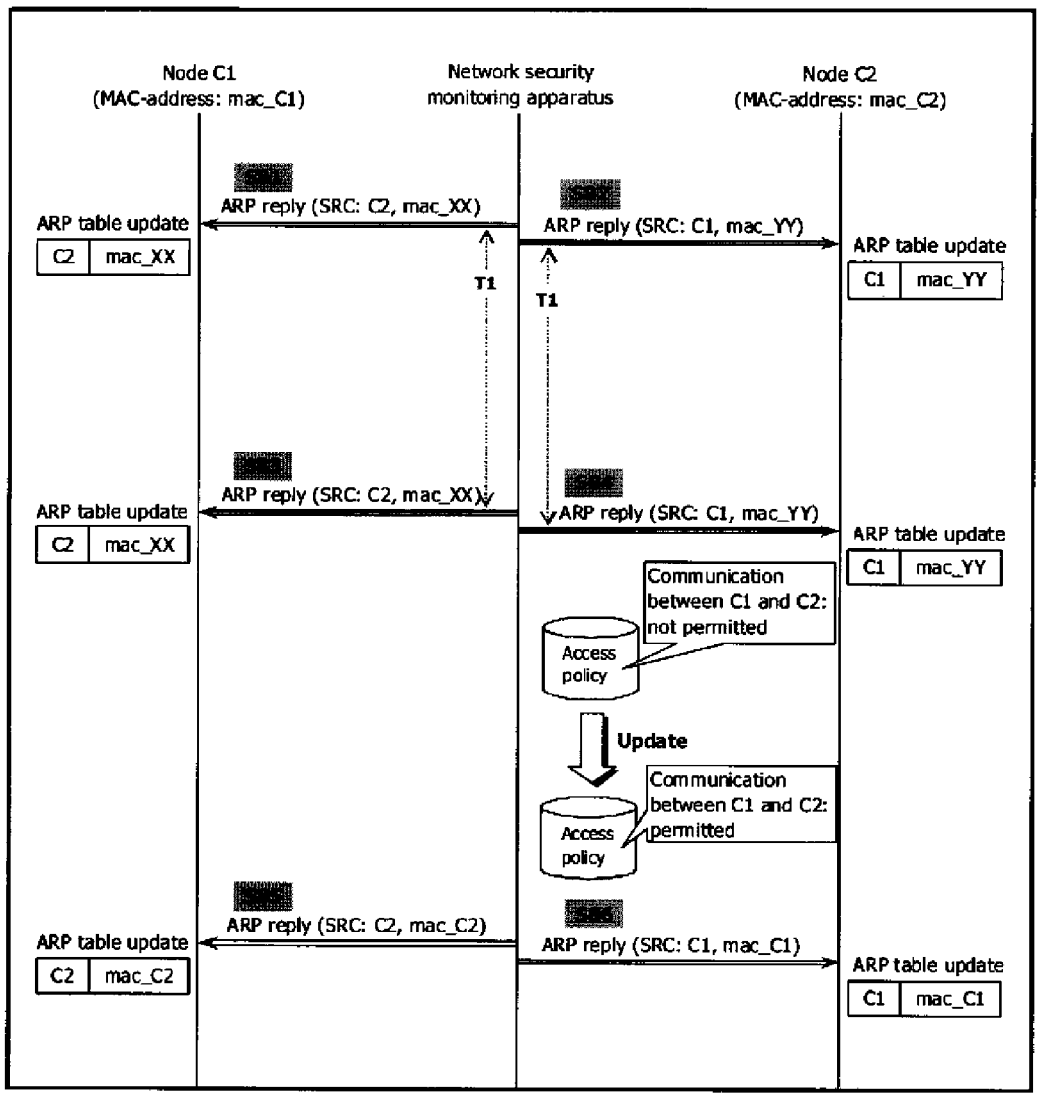
FIG. 8 shows a sequence example between the prototype of the network security monitoring apparatus embodying best mode of the present invention and nodes C1 and C2, after the access policy provided with the prototype of the network security monitoring apparatus has been changed from "not permitted" to "permitted".

FIG. 8 shows a sequence example between the prototype of the network security monitoring apparatus embodying best mode of the present invention and the nodes C1 and C2, after the access policy provided with the prototype of the network security monitoring apparatus has been changed from "not permitted" to "permitted". In the following, a concrete example is explained using FIG. 8.

(1) The network security monitoring apparatus transmits ARP-reply packets repeatedly at fixed time intervals (T1) to node C1 with the IP-address of node C2 and a false MAC-address (mac_XX) as MAC-address of node C2 (S81, S82), as well as transmits ARP-reply packets repeatedly at fixed time intervals (T1) to node C2 with the IP-address of node C1 and a false MAC-address (mac_XX) as MAC-address of node C1 (S82, S84), because the communication between nodes C1 and C2 is defined as "not permitted" in the access policy.

(2) After the communication between nodes C1 and C2 defined in the access policy has been changed from "not permitted" to "permitted", the network security monitoring apparatus stops the repeated transmissions (S81, S83, S82, S84) and transmits an ARP-reply packet to node C1 with the correct MAC-address (mac_C2) as MAC-address of node C2 (S85). When node C1 receives the ARP-reply packet, node C1 updates its ARP table (sets mac_C2 as MAC-address of node C2). As a result, node C1 can communicate with node C2.

(3) Besides, the network security monitoring apparatus transmits an ARP-reply packet to node C2 with the correct MAC-address (mac_C1) as MAC-address of node C1 (S86). When node C2 receives the ARP-reply packet, node C2 updates its ARP table (sets mac_C1 as MAC-address of node C1). As a result, node C2 can communicate with node C1.

As clarified above, the network security monitoring apparatus enables to recover communication between nodes (e.g. C1 and C2) quickly and reliably, by stopping to block communication between nodes C1 and C2, and transmitting ARP-reply packets to node C1 with the correct MAC-address, as well as transmitting ARP-reply packets to node C2 with the correct MAC-address, after the access policy has been changed from "not permitted" to "permitted".

Additionally, if node CX, which is judged to be "not permitted" to communicate with other nodes based on the access policy provided by the network security monitoring apparatus, attempts to connect a node outside the network, the network security monitoring apparatus repeatedly transmits ARP-reply packets to node CX with a false MAC-address as MAC-address of the relay apparatus at fixed time intervals. Besides, the network security monitoring apparatus repeatedly transmits ARP replies to all relay apparatuses in the network with a false MAC-address as MAC-address of node CX in fixed intervals. Thus, the network security monitoring apparatus enables to block communication between the node CX and the node outside the network, by repeatedly transmitting ARP-reply packets to the node CX, which is judged to be "not permitted" to communicate with other nodes based on the access policy, with false MAC-addresses as MAC-address of the relay apparatus at fixed intervals.

Additionally, the policy management processing means (14) provided with the network security monitoring apparatus maintains information such as the MAC-addresses and IP-addresses of the nodes in the network, as well as, other information such as software update history or connection status, and manages the access policy to judge whether the communication between nodes are permitted or not based on the above-mentioned information. Here, the access policy may be updated automatically by the program based on information as the software update history, or manually by the administrator.

As clarified above, the network security monitoring apparatus enables to restrict the nodes that can be accessed for the nodes in which the virus information has not been updated, because the policy management processing means 14 manages the access policy for judging whether communication between nodes are allowed or not based on the MAC-addresses and IP-addresses of the nodes in the network, as well as, other information about the nodes such as software update history or connection status enabling. As a result, the network security monitoring apparatus enables to realize a fail-safe system.

Figure 9:
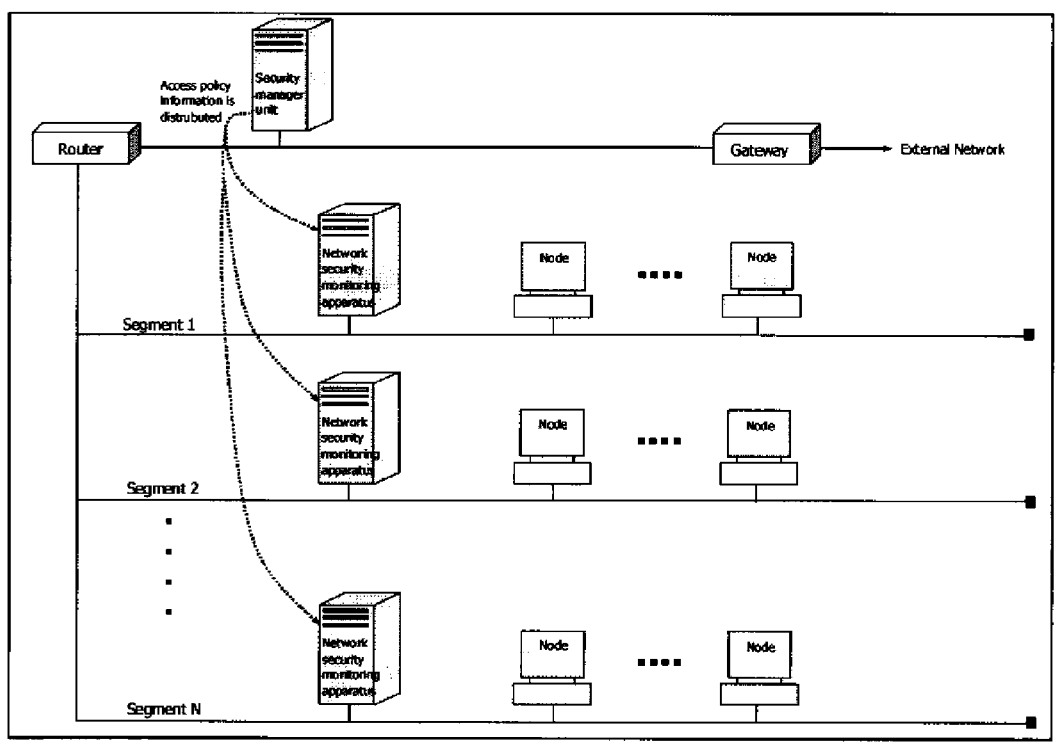
FIG. 9 shows a configuration example of the prototype of the network security monitoring system embodying best mode of the present invention.

FIG. 9 shows a configuration example of the prototype of the network security monitoring system embodying best mode of the present invention. As shown in FIG. 9, in the network security monitoring system, the above described network security monitoring apparatus is deployed in every segment of the network, and performs security administration in the segment by blocking communication between nodes defined as "not permitted" in the access policy and by allowing communication between nodes defined as "permitted" in the access policy. Thus, the network security monitoring system enables to control blocking communication between nodes judged as "not permitted" in the segment quickly and reliably.

The network security monitoring system is equipped with a security management processing means that centrally manages the access policy for the whole network and distributes the latest access policy information from the specified security manager to the network security monitoring apparatus deployed in every segment at the proper time. Then, the network security monitoring apparatus performing security administration in the segment blocks communication between nodes defined as "not permitted" in the access policy and allows communication between nodes defined as "permitted" in the access policy. Thus, the network security monitoring system enables to share the policy information for the whole system, and manage the policy information centrally, while the network security monitoring system monitors communication between nodes in every segment using the latest policy information and controls blocking communication between nodes judged as "not permitted" in the segment quickly and reliably.

Figure 10:
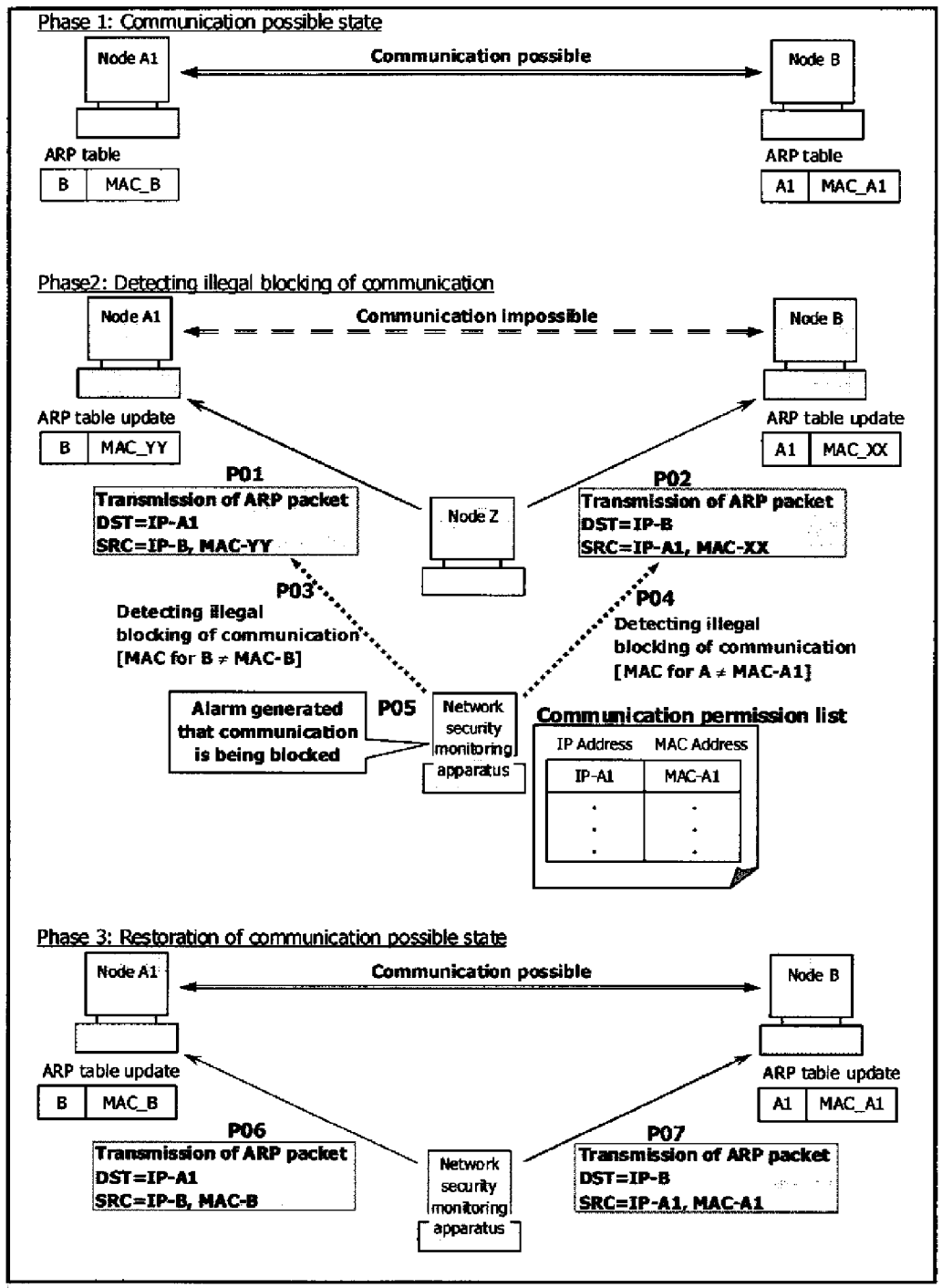
FIG. 10 shows a sequence example when the prototype of the network security monitoring apparatus embodying best mode of the present invention detects illegal blocking of communication using the communication permission list.

FIG. 10 shows a sequence example when the prototype of the network security monitoring apparatus embodying best mode of the present invention detects illegal blocking of communication using the communication permission list.

[Phase 1: Communication Possible State]

At this phase, the communication between nodes A1 and B is enabled, the MAC-address of node B (MAC-B) is set in the ARP table of node A1, and the MAC-address of node A1 (MAC-A1) is set in the ARP table of node B.

[Phase 2: Detecting Illegal Blocking of Communication]

At this phase, the network security monitoring apparatus detects that node Z illegally blocks communication between nodes A1 and B. Node Z transmits an ARP packet to node A1 with the source IP-address (IP-B) and a false MAC-address (MAC-YY) (P01). When node A1 receives the ARP packet, node A1 updates its ARP table (sets MAC-YY as MAC-address of node B). At this situation, node A1 cannot communicate with node B using the data of its ARP table, because the MAC-address of node B in its ARP table is false.

Additionally, node Z transmits an ARP packet to node B with the IP-address (IP-A1) and a false MAC-address (MAC-XX) (P02). When node B receives the ARP packet, node B updates its ARP table (sets MAC-XX as MAC-address of node A1). At this situation, node B cannot communicate with node A1 using the data of its ARP table, because the MAC-address of node A1 in its ARP table is false.

Meanwhile, the network security monitoring apparatus permanently monitors ARP packets transmitted by and received from all nodes connected to the network, extracts ARP packets containing a destination IP-address which is the same as the IP-address of the node An (n: natural number greater than 1) registered in the communication permission list from the ARP packets, and identifies node B corresponding to the source IP-address of the extracted ARP packets. Then, the network security monitoring apparatus judges the extracted ARP packets to be attack packets that illegally attempt to block communication if the source MAC-address of the extracted ARP packets is not the same as the MAC-address of node B registered in the communication permission list, and generates an alarm to the effect that an attack packet attempting to illegally block communication has been detected.

As shown in FIG. 10, the network security monitoring apparatus monitors ARP packet transmitted at P01, extracts ARP packet containing a destination IP-address (IP-A1) registered in the communication permission list, and identifies node B corresponding to the source IP-address of the extracted ARP packet. Then, the network security monitoring apparatus judges whether the source MAC-address of the extracted ARP packet is the same as the MAC-address of node B (MAC-B) registered in the access policy. Then, the network security monitoring apparatus judges the extracted ARP packet to be attack packets that illegally attempts to block communication (P03), because the source MAC-address of the extracted ARP packet (MAC-YY) is not the same as the MAC-address of node B (MAC-B) registered in the access policy, and generates an alarm to the effect that an attack packet attempting to illegally block communication has been detected (P05). Here, the communication permission list, which is maintained by the network security monitoring apparatus, contains the IP-addresses {IP-An1, IP-An2, ..., IP-Ani} (i: natural number greater than 1) and MAC-addresses {MAC-An1, MAC-An2, ..., MAC-Anj} (j: natural number greater than 1) of nodes An (n: natural number greater than 1) permitted to communicate with all nodes connected to the network.

Besides, the network security monitoring apparatus permanently monitors ARP packets transmitted by and received from all nodes connected to the network, and extracts ARP packets containing a source IP-address which is the same as the IP-address of the node An (n: natural number greater than 1) registered in the communication permission list from ARP packets. Then, the network security monitoring apparatus judges the extracted ARP packets to be attack packets that illegally attempt to block communication if the source MAC-address of the extracted ARP packets is not the same as the MAC-address of the node An registered in the communication permission list, and generates an alarm to the effect that an attack packet attempting to illegally block communication has been detected.

As shown in FIG. 10, the network security monitoring apparatus monitors ARP packet transmitted at P02, extracts ARP packet containing a destination IP-address (IP-A1) registered in the communication permission list, and judges whether the source MAC-address of the extracted ARP packet is the same as the MAC-address of node A1 (MAC-A1) registered in the access policy. Then, the network security monitoring apparatus judges the extracted ARP packets to be attack packets that illegally attempt to block communication (P04), because the source MAC-address of the extracted ARP packet (MAC-XX) is not the same as the MAC-address of node A1 (MAC-A1) registered in the access policy, and generates an alarm to the effect that an attack packet attempting to illegally block communication has been detected (P05).

[Phase 3: Restoration of Communication Possible State]

At this phase, the network security monitoring apparatus transmits an ARP packet to node A1 with the correct MAC-address of node B (MAC-B) (P06), if the network security monitoring apparatus detects the illegal blocking of communication with P03. When node A1 receives the ARP packet, node A1 updates its ARP table (sets MAC-B as MAC-address of the node B). At this situation, node A1 can communicate with node B using the data of its ARP table. Similarly, the network security monitoring apparatus transmits an ARP packet to node B with the correct MAC-address of node A1 (MAC-A1) (P07), if the network security monitoring apparatus detects the illegal blocking of communication with P04. When node B receives the ARP packet, node B updates its ARP table (sets MAC-A1 as MAC-address of the node A1). At this situation, node B can communicate with node A1 using the data of its ARP table.

FIG. 11 shows an example setting of the communication permission list provided with the prototype of the network security monitoring apparatus embodying best mode of the present invention.

The communication permission list contains the IP-addresses {IP-An1, IP-An2, ..., IP-Ani} (i: natural number greater than 1) and MAC-addresses {MAC-An1, MAC-An2, ..., MAC-Anj} (j: natural number greater than 1) of nodes An (n: natural number greater than 1) permitted to communicate with all nodes connected to the network.

As shown in FIG. 11, IP-address (IP-A1) and MAC-address (MAC-A1) are defined as IP-address and MAC-address of node A1. Similarly, IP-address (IP-A2) and MAC-address {MAC-A21, MAC-A22, ..., MAC-A2j} (j:natural number greater than 2) are defined as IP-address and MAC-address of node A2 respectively. Similarly, IP-address {IP-A31, IP-A32, ..., IP-A3i} (i: natural number greater than 2) and MAC-address (MAC-A3) are defined as IP-addresses and MAC-address of node A3 respectively. Similarly, IP-address {IP-A41, IP-A42, . . . , IP-A4k} (k: natural number greater than 2) and MAC-address {MAC-A41, MAC-A42, . . . , MAC-A4m} (m: natural number greater than 2) are defined as IP-addresses and MAC-addresses of node A4 respectively. Here, multiple IP-addresses and multiple MAC-addresses are defined for the nodes An to take into account that devices like virtual router may have multiple IP-addresses and multiple MAC-addresses.

Figure 12:
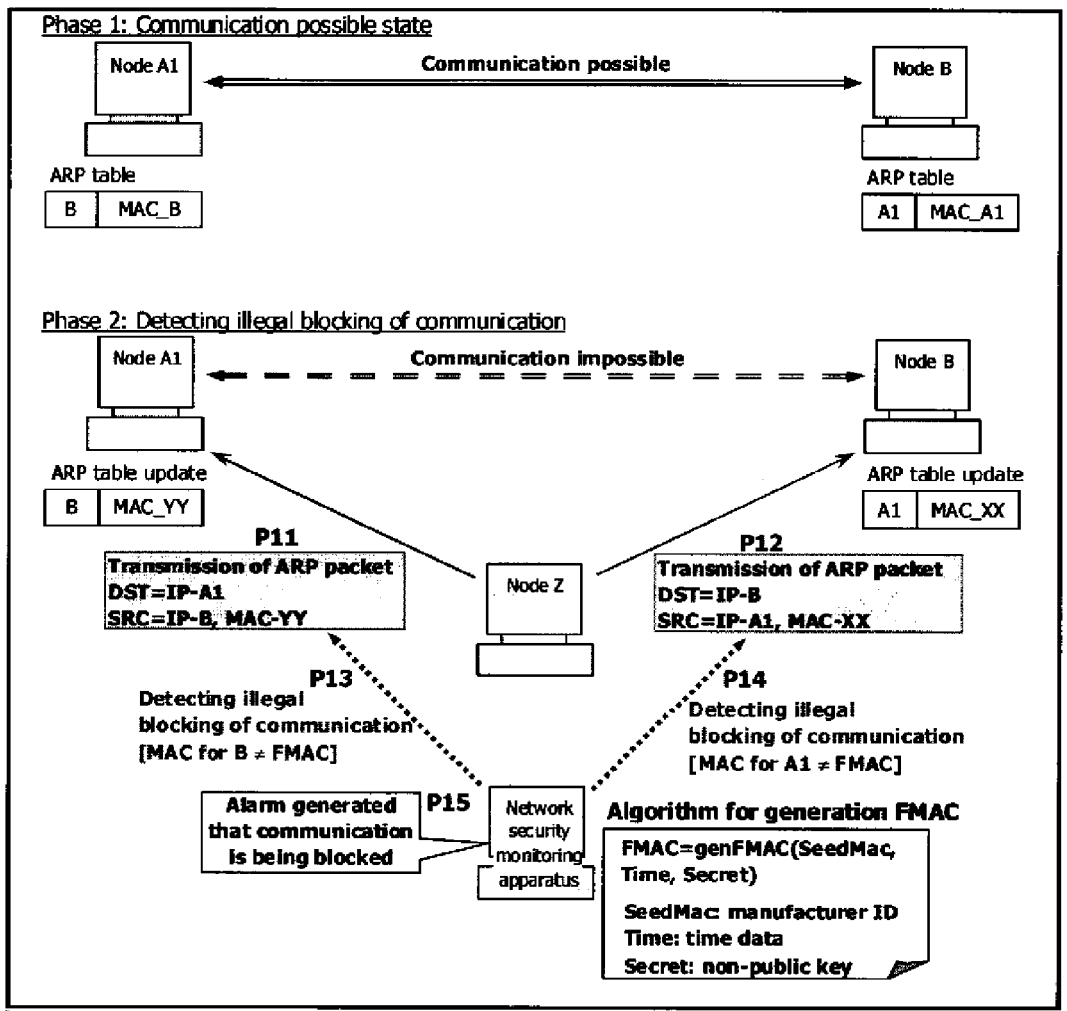
FIG. 12 shows a sequence example when the prototype of the network security monitoring apparatus embodying best mode of the present invention detects illegal blocking of communication using the FMAC generating algorithm.

FIG. 12 shows a sequence example when the prototype of the network security monitoring apparatus embodying best mode of the present invention detects illegal blocking of communication using the FMAC generating algorithm.

[Phase 1: Communication Possible State]

At this phase, the communication between nodes A1 and B is enabled, the MAC-address of node B (MAC-B) is set in the ARP table of node A1, and the MAC-address of node A1 (MAC-A1) is set in the ARP table of node B.

[Phase 2: Detecting Illegal Blocking of Communication]

At this phase, the network security monitoring apparatus detects that node Z illegally blocks communication between nodes A1 and B. Node Z transmits an ARP packet to node A1 with the source IP-address (IP-B) and a false MAC-address (MAC-YY) (P11). When node A1 receives the ARP packet, node A1 updates its ARP table (sets MAC-YY as MAC-address of the node B). At this situation, node A1 cannot communicate with node B using the data of its ARP table, because the MAC-address of node B in its ARP table is false.

Additionally, node Z transmits an ARP packet to node B with the IP-address (IP-A1) and a false MAC-address (MAC-XX) (P12). When node B receives the ARP packet, node B updates its ARP table (sets MAC-XX as MAC-address of the node A1). At this situation, node B cannot communicate with node A1 using the data of its ARP table, because the MAC-address of node A1 in its ARP table is false.

Meanwhile, the network security monitoring apparatus transmits ARP packets containing a false MAC-address (FMAC), which is generated using a one-way function genFMAC, in order to block communication between nodes which have been judged as "not permitted" based on the access policy. Here, the above-mentioned one-way function genFMAC, e.g. a hash function for computing the hash value FMAC, may be defined as follows:

FMAC=genFMAC(SeedMAC,Time,Secret)

The parameter "SeedMac" is the Organizationally Unique Identifier (OUI: Organizationally Unique Identifier) that makes up the first 24 bits of a MAC address (48 bits). The parameter "Time" is time data representing year, month, day, hour, minute and second, and the value of the parameter "Time" is composed of a combination of them. The parameter "Secret" is a non-public key, which is confidential information and will be known only to an authorized manager. The latter 24 bits of the MAC address (48 bits) is composed of a pseudorandom number generated by a hash function with values specified for the parameters "Time" and "Secret". Hash functions have the characteristic that input value cannot be computed from output value and input value with identical output value cannot be easily generated.

Furthermore, the network security monitoring apparatus permanently monitors ARP packets transmitted by and received from all nodes connected to the network, extracts ARP packets with false MAC-addresses. Here, the extraction condition, for instance, that the MAC-address of the extracted ARP packets is not the same as the MAC-address registered in the communication permission list or access policy list, is defined. Then, the network security monitoring apparatus judges the extracted ARP packets to be attack packets that illegally attempt to block communication if the MAC-address of the extracted ARP packets is not the same as the value of FMAC which has been generated by the above mentioned one-way function genFMAC. Thus, the network security monitoring apparatus judges whether the extracted ARP packets are same as the ARP packets which have been transmitted by the network security monitoring apparatus to block communication between nodes judged as "not permitted" based on the access policy, and judges the extracted ARP packets to be attack packets that illegally attempt to block communication if the extracted ARP packets is not the same as the ARP packets which have been transmitted by the network security monitoring apparatus. Then, unauthorized outsider cannot use the value of FMAC to illegally block communication, because the value of FMAC has been generated by a hash function. Furthermore, the administrator can take quick actions, because the network security monitoring apparatus generates an alarm when an attack packet attempting to block communication illegally has been detected.

As shown in FIG. 12, the network security monitoring apparatus monitors ARP packet transmitted at P11, extracts ARP packets with a source MAC-address (MAC-YY) which is false, and judges whether the MAC-address of the extracted ARP packet is the same as the value of FMAC which has been generated by the above mentioned one-way function genFMAC. Then, if the MAC-address of the extracted ARP packets is not the same as the value of FMAC, the network security monitoring apparatus judges the extracted ARP packets to be attack packets that illegally attempt to block communication (P13). Then, the network security monitoring apparatus generates an alarm when an attack packet attempting to block communication illegally has been detected. (P15).

Additionally, the network security monitoring apparatus monitors ARP packet transmitted at P12, extracts ARP packets with a source MAC-address (MAC-XX) which is false, and judges whether the MAC-address of the extracted ARP packet is the same as the value of FMAC which has been generated by the above mentioned one-way function genFMAC. Then, if the MAC-address of the extracted ARP packets is not the same as the value of FMAC, the network security monitoring apparatus judges the extracted ARP packets to be attack packets that illegally attempt to block communication (P14). Then, the network security monitoring apparatus generates an alarm when an attack to illegally block communication has been detected (P15).

Additionally, the network security monitoring apparatus can detect illegally blocked communication, even if an unauthorized outsider has stolen the value of FMAC and attempts to block communication illegally, because the value of FMAC changes with "time" which the one-way-function genFMAC uses as parameter. Then, the parameter "Time" is time data information representing year, month, day, hour, minute and second, and the value of the parameter "Time" is composed of a combination of them. In this case, it is necessary that the network security monitoring apparatus judges, in consideration of time-lag, whether the MAC-address of the extracted ARP packet is the same as the value of FMAC that has been generated by the one-way function genFMAC, in order to detect illegal blocking of communication, for instance, at P13 in FIG. 12. The example of the judgment may be processed as follows:

"IF {source MAC-address of ARP packet=genFMAC(SeedMac, T1, Secret)} or
{source MAC-address of ARP packet=genFMAC(SeedMac, T2, Secret)}
ELSE . . . detecting to illegally block communication" Here, for instance, T1=14 hours 11 minutes and T2=14 hours and 12 minutes are used.

As clarified above, the network security monitoring apparatus enables to easily distinguish ARP packets that illegally block communication from ARP packets transmitted to block unauthorized communication by using a "false MAC-address (FMAC)", which is generated using a one-way function, in order to block communication between nodes that have been judged as "not permitted" based on the access policy. Furthermore, the network security monitoring apparatus enables the administrator to take quick actions, by generating an alarm when an attack packet attempting to block communication illegally has been detected.

Additionally, the network security monitoring system, as described in FIG. 9, enables to reliably and easily detect attacks blocking communication illegally by network security monitoring apparatus, as described in FIGS. 10-12, deployed in network segments. Furthermore, the network security monitoring system enables the administrator to take quick actions, by generating an alarm when an attack packet attempting to block communication illegally has been detected. Furthermore, the network security monitoring system enables to quickly recover communication between nodes illegally blocked, by transmitting an ARP packet containing the correct MAC-address when an attack is detected.

INDUSTRIAL APPLICABILITY

In the past few years, the network environment has grown and an internet-centered information network society has evolved. Network security is an essential service in such an environment. Many venders and software houses release a number of security tools and most companies and universities have used them. The present invention provides the technologies to manage "permitted" or "not permitted" communication between nodes connected to a network based on an access policy. The technology of the present invention can be used for security tools.

The present invention enables to quickly and reliably manage to block communication between nodes judged as "not permitted", by judging whether a node is permitted to communicate with other nodes in the network or not based on the access policy, repeatedly transmitting data to block communication between nodes judged as "not permitted" at fixed time intervals until the access policy of the node defined as "not permitted" has been changed from "not permitted" to "permitted", and completely blocking communication between nodes judged as "not permitted" and the other nodes in the network. At the same time, the present invention enables to allow the connections between nodes defined as "permitted" in the access policy. Furthermore, the present invention enables the administrator to take quick actions, by generating an alarm when an attack to block communication illegally has been detected. Furthermore, the present invention enables to quickly recover communication between nodes that have been illegally blocked, by transmitting an ARP packet containing the correct MAC-address.

What is claimed is:

1. A network security monitoring apparatus that manages "permitted" or "not permitted" communication between all nodes connected to a network based on an access policy, comprising:
    one or more processors;
    packet monitor processing unit for monitoring packets transmitted by and received from all nodes connected to the network;
    policy management processing unit for managing the access policy for all nodes in the network;
    access control processing unit for judging whether a node is permitted to communicate with other nodes in the network or not based on the access policy; and
    communication blocking processing unit for blocking communication between nodes judged as "not permitted" by the access control processing unit,
    wherein the communication blocking processing unit generates a false media access control (FMAC)-address of the nodes judged as "not permitted" by the access control processing unit using a one-way function genFMAC with multiple input parameters and blocks communication between the nodes judged as "not permitted" by transmitting address resolution protocol (ARP) packets with the false media access control (FMAC)-address to the nodes,
    wherein the access control processing unit stops the communication blocking between the nodes and recovers communication between the nodes by transmitting address resolution protocol (ARP) packets with the correct media access control (MAC)-address to the nodes upon the access policy of the nodes being changed from "not permitted" to "permitted,"
    wherein the access control processing unit extracts one or more address resolution protocol (ARP) packets containing a false media access control (FMAC)-address from address resolution protocol (ARP) packets received by the packet monitor processing unit and judges the extracted ARP packet to be an attack packet that illegally attempts to block communication in a case where the media access control (MAC)-address of the extracted address resolution protocol (ARP) packet is not the same as the value of the false media access control (FMAC)-address, and
    wherein the one or more processors are configured to execute the monitoring unit, the managing unit, the judging unit, and the blocking unit.

2. The network security monitoring apparatus according to claim 1, wherein the access control processing unit generates an alarm to the effect that an attack packet attempting to illegally block communication has been detected in a case where the access control processing unit judges the extracted address resolution protocol (ARP) packet to be an attack packet that illegally attempts to block communication.

3. The network security monitoring apparatus according to claim 1, wherein the communication blocking processing unit blocks communication between nodes judged as "not permitted" by continuously transmitting data to block communication until the access policy of the node judged as "not permitted" is changed from "not permitted" to "permitted".

4. The network security monitoring apparatus according to claim 3, wherein the data continuously transmitted to block communication between nodes judged as "not permitted" is transmitted at fixed time intervals set by a user.

5. The network security monitoring apparatus according to claim 3, wherein the data continuously transmitted to block communication between nodes judged as "not permitted" is transmitted at fixed time intervals set by a user.

6. The network security monitoring apparatus according to claim 1, wherein the access control processor generates an alarm to the effect that an attack packet attempting to illegally block communication has been detected in a case where the access control processor judges the extracted address resolution protocol (ARP) packet to be an attack packet that illegally attempts to block communication.

7. The network security monitoring apparatus according to claim 1, wherein the communication blocking processor blocks communication between nodes judged as "not permitted" by continuously transmitting data to block communication until the access policy of the node judged as "not permitted" is changed from "not permitted" to "permitted".

8. A network security monitoring apparatus that manages "permitted" or "not permitted" communication between all nodes connected to a network based on an access policy, comprising:
- a packet monitor processor configured to monitor packets transmitted by and received from all nodes connected to the network;
- a policy management processor configured to manage the access policy for all nodes in the network;
- an access control processor configured to judge whether a node is permitted to communicate with other nodes in the network or not based on the access policy; and
- a communication blocking processor configured to block communication between nodes judged as "not permitted" by the access control processor,
- wherein the communication blocking processor generates a false media access control (FMAC)-address of the nodes judged as "not permitted" by the access control processor using a one-way function genFMAC with multiple input parameters and blocks communication between the nodes judged as "not permitted" by transmitting address resolution protocol (ARP) packets with the false media access control (FMAC)-address to the nodes,
- wherein the access control processor stops the communication blocking between the nodes and recovers communication between the nodes by transmitting address resolution protocol packets with the correct media access control (MAC)-address to the nodes upon the access policy of the nodes being changed from "not permitted" to "permitted," and
- wherein the access control processor extracts one or more address resolution protocol (ARP) packets containing a false media access control (FMAC)-address from address resolution protocol (ARP) packets received by the packet monitor processor and judges the extracted address resolution protocol (ARP) packet to be an attack packet that illegally attempts to block communication in a case where the media access control (MAC)-address of the extracted address resolution protocol (ARP) packet is not the same as the value of the false media access control (FMAC)-address.

* * * * *